United States Patent [19]

Romero et al.

[11] Patent Number: 4,464,124
[45] Date of Patent: Aug. 7, 1984

[54] ELECTRICAL EDUCATIONAL DEVICE

[75] Inventors: Hugo Romero, New Rochelle, N.Y.; Avi Arad, Westport, Conn.; Dietmar Nagel, Chester, N.J.; Melvin Kennedy, New York, N.Y.

[73] Assignee: North American Foreign Trading Corporation, New York, N.Y.

[21] Appl. No.: 365,351

[22] Filed: Apr. 1, 1982

[51] Int. Cl.³ .............................................. G09B 7/06
[52] U.S. Cl. ................................... 434/321; 434/335
[58] Field of Search ............................... 434/319–321, 434/322, 308–311, 314, 335, 315, 316

[56] References Cited

U.S. PATENT DOCUMENTS

| 3,395,464 | 8/1968 | Leslie et al. | 434/315 |
| 3,664,037 | 5/1972 | Budnik et al. | 434/315 |
| 3,715,811 | 2/1973 | Thompson et al. | 434/310 |
| 3,947,972 | 4/1976 | Freeman | 434/321 |
| 3,996,671 | 12/1976 | Foster | 434/321 |
| 4,078,316 | 3/1978 | Freeman | 434/319 |
| 4,117,605 | 10/1978 | Kurland et al. | 434/319 |

Primary Examiner—Richard C. Pinkham
Assistant Examiner—Leo P. Picard
Attorney, Agent, or Firm—Antonelli, Terry & Wands

[57] ABSTRACT

A magnetic tape player has a stereo playback head for reproducing information from adjacent channels on a magnetic tape on which there is recorded a series of questions and answers in successive blocks. In a first portion of each block a given question and a plurality of possible answers are recorded in both channels, in a second portion of the block a coded indication of the correct answer to the question is recorded in one channel, and in a third portion of the block a correct indication is recorded in one channel and an incorrect indication is recorded in the other channel. The second portion of the block is marked by a first tone to indicate the start of the decision time during which one of a plurality of answer buttons is to be depressed to select an answer and the third portion of the block is marked by a second tone to indicate the end of the decision time. The coded indication of the correct answer as derived from the second portion of the block is then compared with the answer button which has been depressed, and the result of this comparison controls the passing of the one or the other channel to an audio output during reproduction of the information recorded in the third portion of the block.

20 Claims, 4 Drawing Figures

ELECTRICAL EDUCATIONAL DEVICE

BACKGROUND OF THE INVENTION

The present invention relates in general to educational devices, and more particularly to a device which is capable of audibly stating questions and responding to manually-inputted answers to those questions with an audible indication of whether the selected answer is correct or incorrect.

Advances in electronics have motivated the design and development of an entirely-new field of educational devices for use by people of all ages. In particular, it has been recognized that children are capable of understanding and learning many subjects with relative ease even at a very-young age if properly motivated. Accordingly, efforts have been made toward the design and development of educational toys which not only serve as a means for amusement of young children, but also provide an educational aspect to their play which leads to an early learning of basic information in many subjects.

Many of the educational devices which are now being developed rely on the use of microprocessors and other complex electronic circuitry which not only provides a complex operating procedure, but also considerably increases the cost of such devices to the consumer. Unfortunately, the more complex devices which require intricate procedures for operation of the device cannot be used by younger children not only because they are incapable of performing such complex operations, but because such devices tend to lose the interest of the younger player rather quickly in view of the tedious and/or complicated operating requirements thereof.

Thus, devices have been proposed as amusement/hearing instruments which audibly reproduce questions from a magnetic tape and respond to a manually-inputted answer with an audible response which indicates whether the selected answer was correct or incorrect. Such a device is disclosed, for example, in the Freeman U.S. Pat. No. 3,947,972. However, all of these systems are characterized by the fact that the recorded questions and a response to each possible answer to the question are provided in separate tracks on the magnetic tape and selection buttons for answer selection are provided for direct selection, either electrically or mechanically, of one of the tracks on the magnetic tape for reproduction of the question and/or a selected answer.

The obvious disadvantage with these systems is the need for multiple tracks on the magnetic tape which not only provides for poor efficiency in the use of the tape insofar as the storage capacity thereof is concerned, but also limits the number of possible answers to be selected for each question. The result is a system which is complex, expensive, inefficient and may require a tape unit of special construction.

BRIEF DESCRIPTION OF THE INVENTION

It is therefore an object of the present invention to provide a device of rather simple construction which is capable of providing an audio output in the form of a series of questions and of responding to answers manually input by the player to indicate whether the answer selected is right or wrong for that particular question, on the basis of coded information recorded with the question.

In a preferred embodiment of the invention, the device includes a magnetic tape player which is capable of reproducing information recorded on a cassette tape, the recorded information comprising a series of questions spaced along the length of the tape with spaces between the questions which magnetically carry a coded answer to the preceding question, which recorded answer is automatically compared to a manual response by the player to determine whether the answer selected by the player is right or wrong.

A further feature of the present invention relates to the provision of a player of the type described in which the system automatically compares an answer which is inputted by selection of one of a plurality of answer buttons to a recorded answer and produces an audible response indicating whether the player's selection is correct or incorrect.

Another feature of the present invention relates to the provision of a player of the type described which requires only two tracks on a magnetic tape to record a question and substantially any number of selectable answers to that question since the determination of the correctness of the selected answer is accomplished logically on the basis of recorded information rather than by track selection.

This player may be provided in the form of a simple tape unit fitted with a stereo playback head. Either one of the two channels on the tape can be selected to be applied to the audio output, the channel selection being controlled by a combination of information recorded on the tape and the state of various decision or answer buttons as determined by a logic control circuit. A series of tones recorded on the tape provide an audible indication of the start of sequential question and answer periods, and these tones are also used by the logic control circuit in its determination of whether the correct decision or answer button has been depressed and to automatically switch between channels on the tape to announce whether the selected answer is correct or incorrect.

Thus, the present invention requires no complex or expensive electronic circuitry, but in its simplest form provides a standard cassette tape player and simple logic circuitry including standard circuit elements to provide a device having very simple operating requirements.

BRIEF DESCRIPTION OF THE DRAWINGS

These and other objects, features, and advantages of the present invention will become more apparent from the following detailed description of a preferred embodiment, which is illustrated in the accompanying drawings, and wherein.

DETAILED DESCRIPTION OF A PREFERRED EMBODIMENT

Figure 1:
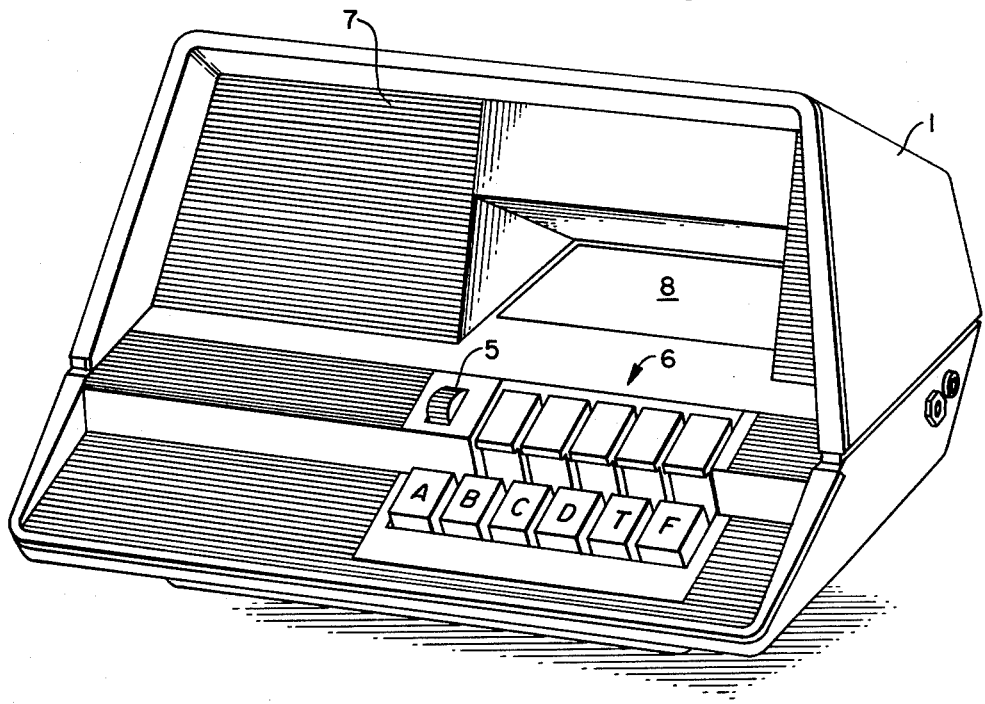
FIG. 1 is a perspective view of the talking player in accordance with the present invention.

One embodiment of the present invention in the form of a magnetic tape player is illustrated in FIG. 1. The magnetic tape player includes a housing 1 which houses the magnetic tape playing device and the electronic logic circuitry necessary in responding to the manually-inputted answers to questions reproduced audibly from the magnetic tape. The housing 1 includes a keyboard which comprises a series of pushbuttons by which the operator inputs his answers to the questions audibly reproduced from the magnetic tape. Thus, one button carries the designation "A", a second button carries the designation "B", a third button carries the designation "C", while a fourth button carries the designation "D". Fifth and sixth buttons carry the designations "T" and "F" for true and false, respectively. As a result, the system may state a question to which there may be a plurality of possible answers designated "A", "B", "C", or "D", or the question may require simply a true or false answer. In response to the question, the operator simply presses the proper button on the keyboard indicating his selection of an answer and the system will then automatically provide an audible response indicating whether the selected answer is correct or incorrect.

The keyboard on the device illustrated in FIG. 1 also includes a rotary dial 5 and a series of keys 6 for controlling the magnetic tape device, which may be a cartridge or cassette tape unit. The rotary dial 5 when operated controls the volume to a speaker located behind a grill 7.

The set of keys 6 are the standard operating keys for the tape unit and may include start, stop, fast forward, rewind, pause and the like keys typically provided on a conventional tape deck. In this regard, the present invention is not limited to use with any special or particular type of tape deck, but may be applied to any cassette or cartridge deck of typical construction having a stereo read-out capability. In FIG. 1 the housing 1 is designed for a cassette tape deck, a pivotable cover 8 being provided to cover the tape playback station where the drive spindles and playback head are located and into which the cassette tape is inserted during use.

Figure 2:
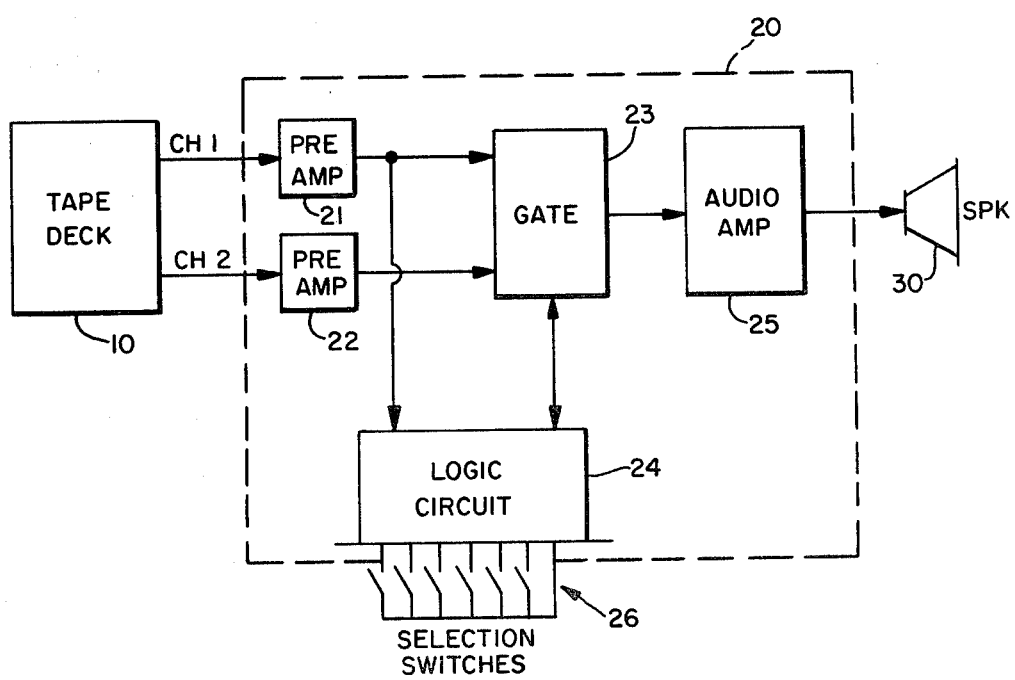
FIG. 2 is a schematic block diagram of the basic electrical system for the talking player of FIG. 1.

FIG. 2 illustrates in basic form the control circuitry for the device of FIG. 1. A tape deck 10 is the source for the recorded questions and answers which is provided in the form of a standard tape unit having a stereo playback head capable of reproducing magnetically-recorded information from one or the other of a pair of adjacent channels on a magnetic tape in a selective manner. The tape deck 10 is connected to a control circuit arrangement 20 comprising a pair of preamplifiers 21 and 22 connected to the respective output channels CH1 and CH2 of the tape deck 10, a gate 23 connected to receive the outputs of the preamplifiers 21 and 22, an audio amplifier 25 connected to the output of the gate 23, and a speaker 30 which receives the output signal from the amplifier 25. A logic circuit 24 receives information from the output of preamplifier 21 relating to the information derived from the channel CH1 at the output of the tape deck 10 and operates to control the gate 23 on the basis of a comparison between the information recorded in the channel CH1 and the information selected by the player via the switches 26. Depending upon the comparison operation performed by the logic circuit 24, the gate 23 is controlled to supply to the amplifier 23 either the output of the preamplifier 21 representing the recorded channel CH1 or the output of the preamplifier 22 representing the recorded channel CH2.

Figure 3:
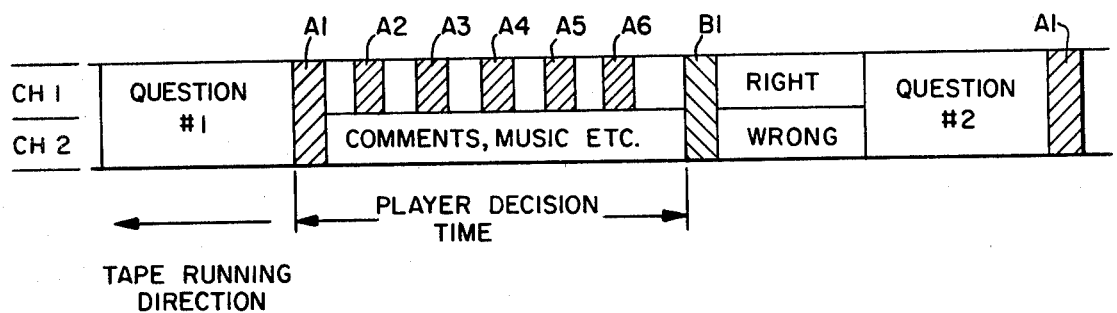
FIG. 3 is a diagram showing the information as recorded on the tape used with the talking player of FIG. 1.

FIG. 3 illustrates the format of the recorded information on the magnetic tape which is provided in the form of a cassette tape or cartridge tape in the tape deck 10.

As in the standard stereo recording format, the recorded information is provided on the magnetic tape in the form of adjacent channels CH1 and CH2 so that either the same or different information may be recorded in a side-by-side manner on the tape. At spaced areas along the length of the magnetic tape there are recorded a succession of questions, two such areas labeled question No. 1 and question No. 2 are shown by way of example in FIG. 3. In these areas containing the recorded questions, the same recorded information is provided both in channel CH1 and channel CH2, so that this information will be reproduced whether the audio amplifier 25 and speaker 30 are connected by the gate 23 to receive either the channel CH1 information or the channel CH2 information. This information may consist, for example, simply of a spoken question followed by a statement of various possible answers to that question. Additionally, any other type of narrative information which may relate to the question in any way can be included in these areas on the tape reserved for the statement of the question and the various possible answers which may be selected in relation thereto.

Following each space reserved for the statement of the question and possible answers thereto, a space A is provided which includes, first of all, a band A1 which extends across both of the channels CH1 and CH2 and includes a recorded tone at a first audible frequency, for example, 1750 Hz. Following the band A1 in the channel CH1 only, there may be provided a number of further partial bands in which the same tone at the first frequency is recorded. The number of recorded bands A1 and A2 indicate additively the number of the answer to the previously-recorded question. Thus, the band A1 will always be present and will always extend across both channels CH1 and CH2 so that regardless of the condition of the gate 23 in FIG. 2, the speaker will reproduce the tone recorded in that channel to indicate the start of the decision time during which the player is to make his selection of the answer to the question. If the correct answer out of those available answers is the first one indicated during the question period, then only the band A1 will have the tone recorded therein. On the other hand, if the second answer of the available answers is the correct answer, then both the band A1 and the band A2 will be recorded with the tone. Thus, the number of bands A1, A2 ... A6 which may be provided during the recorded period A on the tape equals the maximum number of selection keys provided on the keyboard, as seen in FIG. 1.

During the period A on the tape following the tone band A1, there is recorded in the channel CH2 portion of the tape music, comments, or any other type of recorded information which it may be desirable to present to the player as he is considering the question and the possible answers thereto. Thus, the period A on the tape following each question period represents the player decision time during which he must decide which answer to the previously-stated question is the correct answer. During this period of time, he will hear from the speaker 30 music or other information, such as a restatement of the possible answers to the previous question, as he decides which answer to select.

Following the period A which represents the player decision time, there is a period B during which the system responds to the player's answer and indicates whether his selection of an answer is correct or incorrect. This period B includes a band B1 which extends across both of the channels CH1 and CH2 of the tape and is recorded with a tone at a second audible frequency which is higher or lower than the frequency of the tone recorded in the band A1 at the start of the player decision time. The frequency of the tone recorded in the band B1 may be, for example, 1350 Hz, which is reproduced by the speaker 30 regardless of the state of the gate 23 so that the player will hear this tone indicating the end of the decision time. At this point, the system automatically responds to the player's selection of an answer and provides a readout of the information recorded either in channel CH1 or channel CH2 of the band B2 of the period B. Thus, the player will hear either a statement indicating that his answer is correct, such as "you are correct" or "that's right", or the like. On the other hand, if the player has selected the wrong answer, the system will provide a response such as "that's wrong" or "your answer is incorrect" or a similar response. Following the period B on the tape, the next question period is provided.

FIG. 3 discloses the details of the electronic control circuitry which responds to the recorded information on the tape and controls the state of the gate 200 in accordance with the answer selected by the player by way of the keys on the keyboard. The stereo playback head 11 which forms part of the tape deck 10 provides respective outputs representing the information recorded in the channels CH1 and CH2 of the magnetic tape, as described in conjunction with FIG. 3. These outputs are supplied to the preamplifier 21 and 22, respectively, the outputs of which are in turn supplied to the gate 200, which selectively passes one or the other of these information signals through the audio amplifier 25 to the speaker 30, in the manner already described with respect to FIG. 2.

The output from the preamplifier 21 which represents the information recorded in the channel CH1 on the magnetic tape is applied to a tone decoder 201 which operates to detect the first frequency, i.e., the frequency of the tone recorded in the bands A1–A6 on the magnetic tape following the question period. Upon detection of the frequency A by the tone decoder 201, a squarewave output is applied to a delay and pulse-shaping circuit 202 which produces an output pulse applied to the SET input of a flip-flop 203 and simultaneously to a clock input of a counter 204. Thus, with the detection of successive tones at the frequency A which may be recorded in the bands A1–A6, the counter 204 is advanced to sequentially enable the outputs A1–A6 thereof which are connected to respective AND gates 205–210.

The decision buttons A, B, C, D, T and F which may be selectively depressed by the player in response to the stated question reproduced from the tape, will connect a logic level B+ to the second input of one of the AND gates 205–210 to enable that gate. In this regard, the decision buttons operate respective interlocked switches which permit depression of only one switch at a time. Thus, the player can only select one of a plurality of possible answers by depressing a given decision button on the keyboard of the device thereby enabling a single one of the AND gates 205–210.

The outputs of the AND gates 205–210 are applied through an OR gate 211 to one input of an AND gate 212, the output of which serves to reset the flip-flop 203. The state of the flip-flop 203 determines the state of the gate 200 which serves to select which of the recorded channels CH1 or CH2 are applied through the audio amplifier 25 to the speaker 30. For this purpose, the other input to the AND gate 212 is enabled by a pulse output from a delay and pulse-shaping circuit 214, the output of which is also supplied to the reset input of the counter 204. This circuit 214 produces an output pulse in response to a squarewave supplied by a signal integrator 213, which is connected to receive the recorded information at the output of preamplifier 21 in the channel CH1.

The system of FIG. 3 operates in the following manner. The state of the gate 200 which selectively applies either the channel CH1 or the channel CH2 through the audio amplifier 25 to the speaker 30 is unimportant during the reading of that portion of the magnetic tape which includes a statement of the question and selection of possible answers since this information is recorded both in channel CH1 and channel CH2 on the tape. However, when the tone at the frequency A recorded in the band A1 is detected by the tone decoder 201, a squarewave pulse will be applied to the delay and pulse-shaping circuit 202, which produces an output pulse setting the flip-flop 203 (if it is not already in the set state) and advancing the counter 204 so as to provide an output on lead A to the AND gate 205. At the same time, the operator will audibly hear the tone at the frequency A which is supplied to the speaker 30, indicating to the operator that the decision time for selection of an answer has begun. This tone at the frequency A is applied to the speaker 30 regardless of the state of the gate 200 since the tone is recorded in the band which extends across both of the channels CH1 and CH2. However, when the flip-flop 203 is set, (or if it was already previously set) the gate 200 will be switched to apply the recorded information from the channel CH2 at the output of preamplifier 22 through the audio amplifier 25 to the speaker 30. The player will therefore hear what is recorded in the channel CH2 during the period A on the tape, such as music, a restatement of the question and possible answers, or any other information. At the same time, the tone decoder 201 continues to detect successive tones at the frequency A which may be provided in the bands A2 through A6, depending on the numerical designation of the correct answer associated with the previous question. Each time the tone decoder 201 detects another band carrying a recorded tone at the frequency A, a pulse is provided at the output of the delay and pulse-shaping circuit 202 to the clock input of the counter 204 to advance the counter to step the enabled output from the previously-enabled lead A to the successive leads B, C, . . . and so forth, successively enabling the AND gates 205–210.

As an example, if the correct answer to the previously-reproduced question is an answer designated (C), a tone at the frequency A will be recorded in the bands A1, A2 and A3 and three pulses will be applied to the clock input of the counter 204 stepping the output thereof to the lead C extending to one input of the AND gate 207. During this decision period, the player will depress one of the decision buttons to close the contacts of the associated switch and connect B+ to the second input of the associated AND gate 205–210. If the player depresses the decision button C in the stated example, the AND gate 207 will be enabled by the output of the counter 204, providing an output through the OR gate 211 to one input of the AND gate 212. Thus, when the AND gate 212 is enabled, an output will be applied to reset the flip-flop 203 to control the gate 200 to switch the output of preamplifier 21 through the audio amplifier 25 to the speaker 30 thereby reproducing the information recorded in the channel CH1. As indicated in FIG. 3, this will produce an audio reply indicating that the player has correctly selected the answer to the previous question. On the other hand, if the player has selected any other decision button than the button C, none of the AND gates 205–210 will be enabled, with the result that the AND gate 212 will not be enabled and the flip-flop 203 will remain set. Under this condition, the gate 200 will continue to apply the output of preamplifier 22 through the audio amplifier 25 to speaker 30 so as to audibly reproduce the information recorded in the channel CH2. As indicated in FIG. 3, this will result in a reply indicating that the player has selected the wrong answer.

In addition to the audio reply indicating the correctness or incorrectness of the selected answer, other visual or audible effects may accompany this decision making operation. For this purpose special effects circuitry 225 may respond to the output of flip-flop 203 and circuit 214 to energize lights, horns, buzzers or the like for a correct or incorrect answer.

The timing for enabling of the AND gate 212 is controlled by the signal integrator 213 and the delay and pulse-shaping circuit 214 in the following manner. The signal integrator 213 responds to both of the recorded tones, i.e., the tones at the frequency A and the tones at the frequency B on the tape. Each time one of these tones is supplied from the channel CH1 to the signal integrator, a squarewave output will be applied to the delay and pulse-shaping circuit 214; however, the circuit 214 is inhibited by the output of the tone decoder 201 which detects tones at the frequency A. Thus, for each tone at the frequency A reproduced from channel CH1 on the magnetic tape, the delay and pulse-shaping circuit 214 will be inhibited preventing an output pulse to be provided therefrom to enable the AND gate 212 or reset the counter 204. However, when the tone at the frequency B which appears in the band B1 is applied to the signal integrator 213, no output will be produced from the tone decoder 201 so that the delay and pulse shaping circuit 214 will not be inhibited. As a result, an output will be produced by the circuit 214 which enables the AND gate 212 permitting the flip-flop to be reset if an output is supplied to the AND gate 212 via the OR gate 211, as already described. At the same time, this tone at the frequency B will be applied through the gate 200 and the audio amplifier 25 to the speaker 30 providing a signal to the player that the end of the decision time has been reached. Following this, the audible indication of whether the player has selected the right or wrong answer is provided from the tape as already indicated.

While the exemplary embodiment described herein has particular application as an educational toy for younger children, it should be apparent that the level or subject matter of the questions or other information recorded on the tape is not limited by the present invention so that the disclosed device can be used by people of all ages as an educational aid. For example, such a device can be used by students of all educational levels as an aid to studying for exams or for basic study of any subject matter at the selection of the user. In this regard, with the use of a cassette tape to provide the recorded information, one can select any subject matter for study with this equipment by simply inserting the proper tape in the device.

It should also be apparent that the present invention is not limited simply to a device for reproducing recorded information, but also can include the recording of questions as well. This can be accomplished in a manner similar to that provided in automatic telephone answering equipment which allows the caller to record information on a magnetic tape as a message. In this way, a student studying for an examination can insert his own questions and selection of answers on the tape as his course of study progresses, and he then may use that tape in studying for the final examination to review all of the subject matter provided during the term of the course.

Various other features which have not been specifically described or illustrated in the examplary embodiment may also be incorporated into the system in accordance with the present invention. Thus, rather than using interlocked switches with the decision buttons, an electronic keyboard may be provided in the well-known manner. In addition, light-emitting diodes may be provided on the keyboard to provide a visual indication of which decision button has been depressed.

Figure 4:
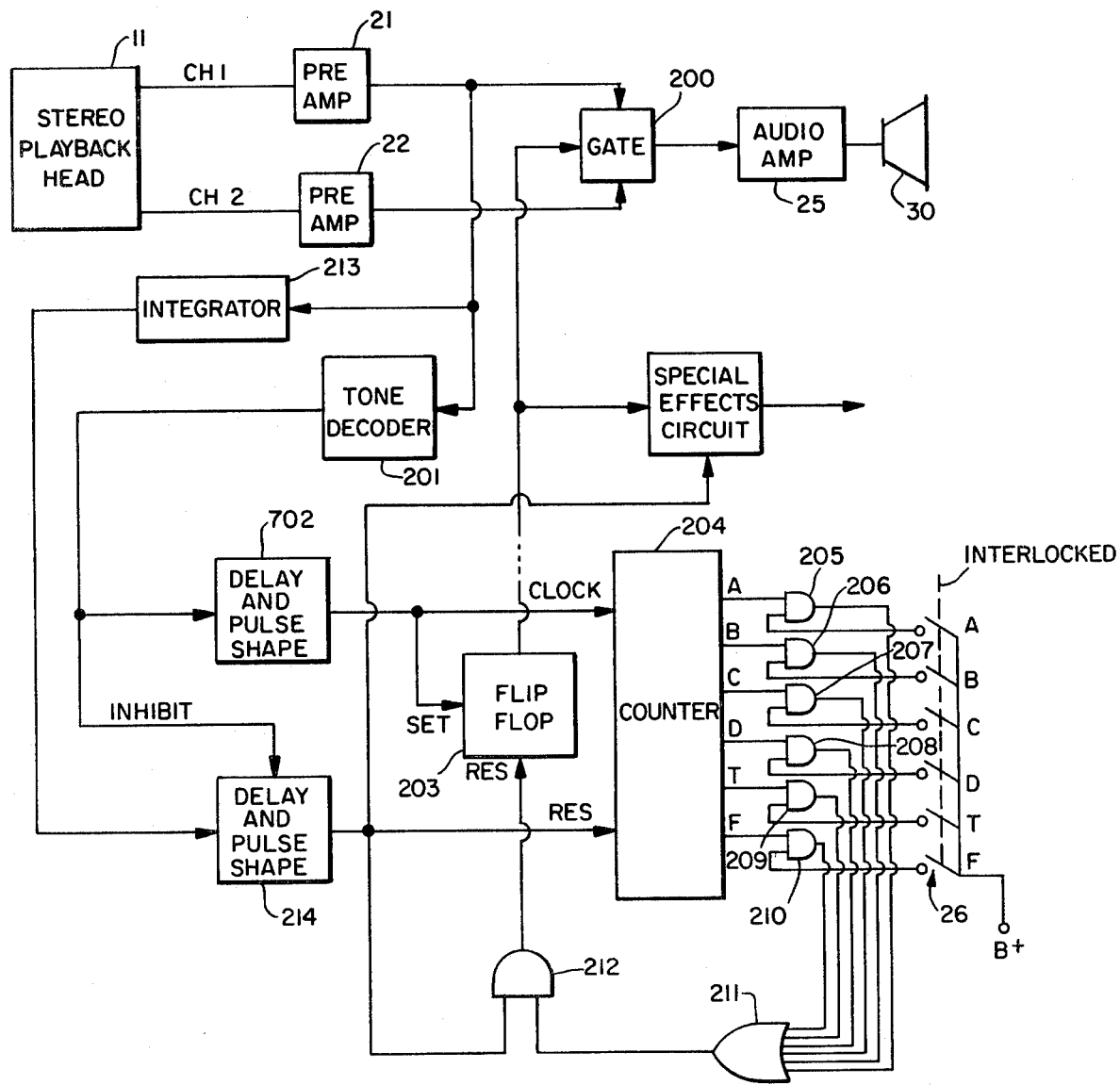
FIG. 4 is a more detailed block diagram of the electrical control circuit for the talking player of FIG. 1.

In the specific embodiment illustrated in FIG. 4, the signal which controls resetting of the counter 204 and enabling of AND gate 212 is derived from a signal integrator 213 and an inhibitable delay and pulse shaping circuit 214; however, it should be apparent that the integrator 213 may be replaced by a second tone decoder which is responsive to the frequency B, thereby eliminating any need for inhibiting of the circuit 214 from the output of tone decoder 201.

Further, while it has been indicated that the numbers of bands A1–A6 following each question provides a direct indication of the number of the correct answer to that question, it should be apparent that these bands A1–A6 could be provided in a pattern representing a digital code, and that more or less than six bands may be provided depending on the number of possible answers to the previously-recorded question.

While we have shown and described several embodiments in accordance with the present invention, it is understood that the invention is not limited to the details shown and described herein but is susceptible of numerous changes and modifications as obvious to those of ordinary skill in the art, and we therefore do not wish to be limited to the details shown and described herein but intend to cover all such changes and modifications known to one of skill in the art.

What is claimed is:

1. A system for reproducing information recorded at periodic intervals on a magnetic tape in first and second channels including both data and control information comprising means including at least one magnetic head for reproducing as first and second electrical signals the information recorded at periodic intervals in said first and second channels on the magnetic tape, repectively; selection means including a plurality of switches individually selectively connectable to a voltage level for producing an output indicative of the manual selection of one of a plurality of selection states; comparison means for comparing the output of said selection means with the control information reproduced by said magnetic head including a plurality of AND gates having one input connected to a respective one of said switches and means for applying said control information from said magnetic head to a second input of said AND gates; indication means for providing first or second indications in dependence on the result of said comparing by said comparison means, including an electrical transducer and control means responsive to said comparison means for applying one or the other of said first and second electrical signals to said electrical transducer in accordance with the result of said comparison; and timing means responsive to the detection of a tone at a first frequency during each periodic interval for enabling operation of said control means; wherein said control information is provided in one of said first and second channels as one or more tones at a second frequency and wherein said means for applying said control information to said AND gates includes a tone decoder connected to receive one of said first and second electrical signals and a counter having an input connected to receive the output of said tone decoder and plurality of outputs connected respectively to the second inputs of said AND gates.

2. A system as defined in claim 1, wherein said electrical transducer is a speaker.

3. A system as defined in claim 1, wherein said timing means includes signal detection means inhibited by the output of said tone decoder for providing an output representing detection of a tone at said first frequency.

4. A system as defined in claim 1, wherein said timing means includes a second tone decoder for detecting tones at said first frequency.

5. A system as defined in claim 1, wherein said control means includes a gate for selectively connecting said first or said second electrical signals to said electrical transducer, a flip-flop responsive to the output of said tone decoder for controlling said gate to pass said first electrical signal and means responsive to said comparison means and said timing means for resetting said flip-flop to control said gate to pass said second electrical signal.

6. A system as defined in claim 1, wherein said switches are interlocked so that only one switch will remain operated at a time.

7. A magnetic tape player for reproducing from first and second channels of a magnetic tape sequential blocks of information including data and control information, said control information being recorded in one of said first and second channels and including one or more tones at a first frequency, comprising a tape unit including a playback head for reproducing as electrical signals the sequential blocks of information from the magnetic tape; an audio output circuit including at least one speaker to which the output of said playback head is to be selectively applied; selection means for providing an indication of the manual selection of one of a plurality of available choices which are each assigned a different numerical value; and control means responsive to the numerical value indicated by tones at said first frequency provided as part of the control information in each block of information reproduced by said playback head and the numerical value of the manual selection indication from said selection means for selectively applying the data in said block of information which is recorded either in said first or said second channel to said audio output circuit.

8. A magnetic tape player as defined in claim 7, wherein said playback head is a magnetic head providing respective first and second electrical signals representing the information recorded in said first and second channels, respectively, and wherein said control means includes decoder means connected to receive one of said first and second electrical signals for determining the number of tones at said first frequency provided by the control information in each block of information.

9. A magnetic tape player as defined in claim 8, wherein said control means includes comparison means for comparing the number of tones at said first frequency provided by the control information in each block of information reproduced by said playback head with said manual selection indication and gate means for selectively passing either said first or said second electrical signal to said audio output circuit in accordance with the result of said comparing operation.

10. A magnetic tape player as defined in claim 9, wherein said tone decoder means comprises a tone decoder capable of detecting said tones at said first frequency to produce pulses in response thereto and a counter responsive to the pulses from said tone decoder for enabling successive outputs in accordance with the number of tones detected within each sequential block of information.

11. A magnetic tape player as defined in claim 10, wherein said selection means includes a plurality of selection switches individually selectively connectable to a voltage level, and wherein said comparison means includes a plurality of AND gates having first inputs connected to a respective one of said selection switches and second inputs connected to respective ones of the outputs of said counter.

12. A magnetic tape player as defined in claim 11, further including timing means responsive to a tone at a second frequency marking a trailing portion of each block of information recorded on said tape for operating said gate means in response to said comparison means.

13. A magnetic tape player as defined in claim 12, wherein said timing means includes a flip-flop having its set input connected to receive the output of said tone decoder, means for detecting said tone at said second frequency, and a further AND gate having one input connected to the output of said comparison means and a second input connected to said detecting means, the output of said further AND gate being connected to the reset input of said flip-flop, the output of which is connected to said gate means in control thereof.

14. A magnetic tape player for reproducing recorded information from a magnetic tape having first and second recorded channels, comprising reproducing means for selectively reproducing the information recorded on said first and said second recorded channels as first and second electrical signals; transducer means responsive to said first and second electrical signals for audibly presenting said recorded information; selection means for indicating the manual selection of one of a plurality of selection states; connection means for connecting only one or the other of said first and second electrical signals to said transducer means; and logic circuit means responsive to said selection means and to control signals forming part of said recorded information in one of said first and second recorded channels as provided by said reproducing means for controlling said connection means, whereby the recorded information of only one of said first and second recorded channels is audibly presented by said transducer means in a selective manner at any given time, including means responsive to said control signals for controlling said connection means to apply to said transducer means that one of said first and second electrical signals which is derived from the recorded channel not including said control signals while said control signals are being detected and for controlling said connection means to apply either of said first and second electrical signals to said transducer means at other times depending on the correspondence between the output of said selection means and said control signals.

15. A magnetic tape player as defined in claim 14, wherein said logic circuit means includes comparison means for comparing the manual selection indicated by said selection means with said control signals to determine coincidence or lack of coincidence therebetween and control means for controlling said connection means to connect only one of said first and second electrical signals to said transducer means on the basis of the output of said comparison means.

16. A magnetic tape player as defined in claim 15, wherein said control means includes a flip-flop and said connection means comprises a gate responsive to the state of said flip-flop for selectively passing said first or said second electrical signal to said transducer means.

17. A method of recording a series of questions and answers as successive blocks of information in first and second channels on a magnetic tape comprising the steps of magnetically recording the same question in both of said first and second channels in a first portion of a block of information;

magnetically recording in a least one of said first and second channels in a second portion of the block of information following said first portion a code indication of the answer to the question recorded in said first portion; and magnetically recording in a third portion of the block of information following said second portion a first indication of a correct response in one of said first and second channels and a second indication of an incorrect response in the other of said first and second channels.

18. A method as defined in claim 17, wherein the code indication of the answer is recorded in said second portion consists of one or more tone bands at a first frequency in spaced positions providing a decimal representation of one of a plurality of possible answers.

19. A method as defined in claim 18, wherein the first tone band at said first frequency extends across both of said first and second channels.

20. A method as defined in claim 18, wherein the beginning of said third portion of the block of information is marked by a tone band at a second frequency extending across both of said first and second channels.

* * * * *